United States Patent Office 3,420,037
Patented Jan. 7, 1969

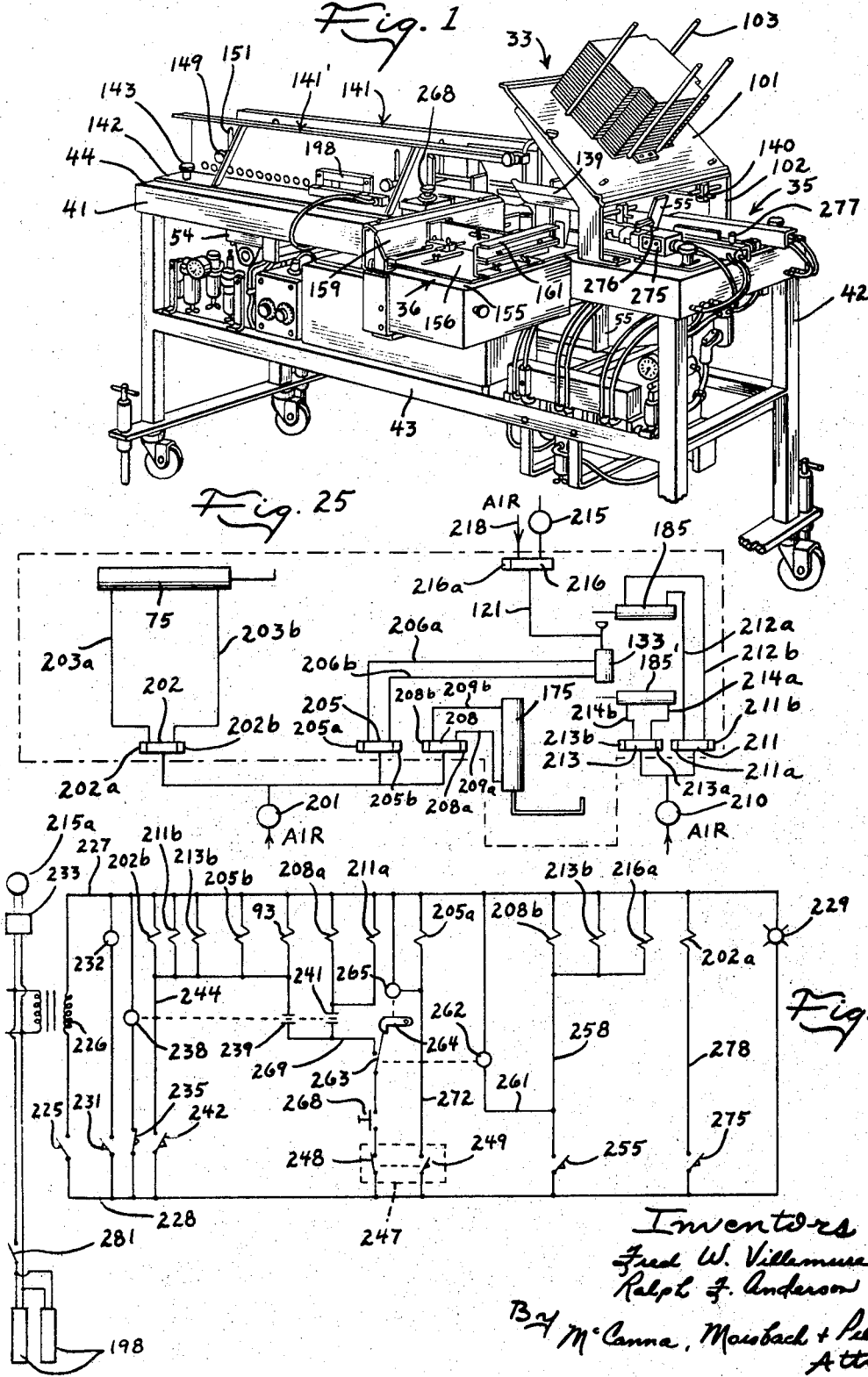

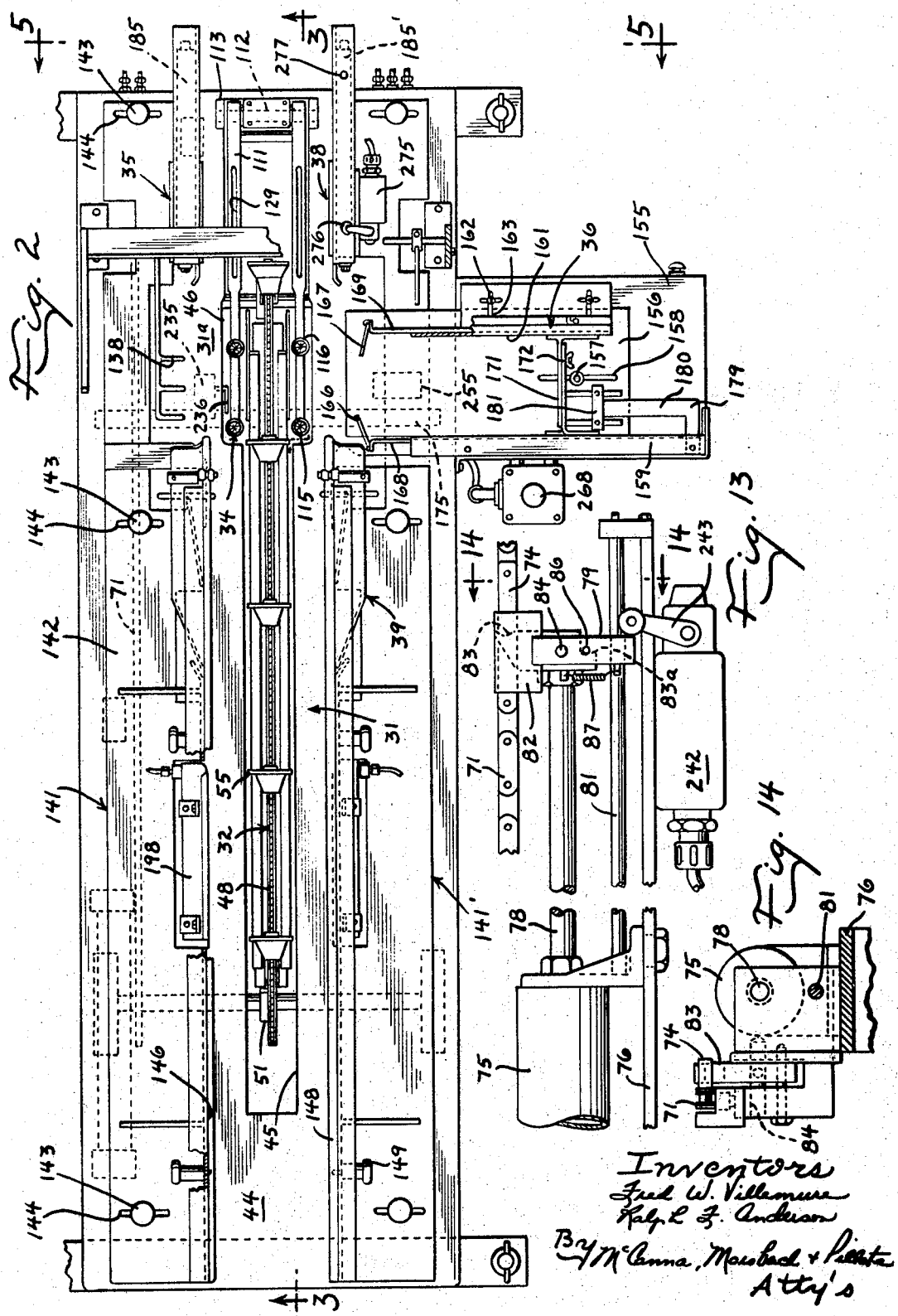

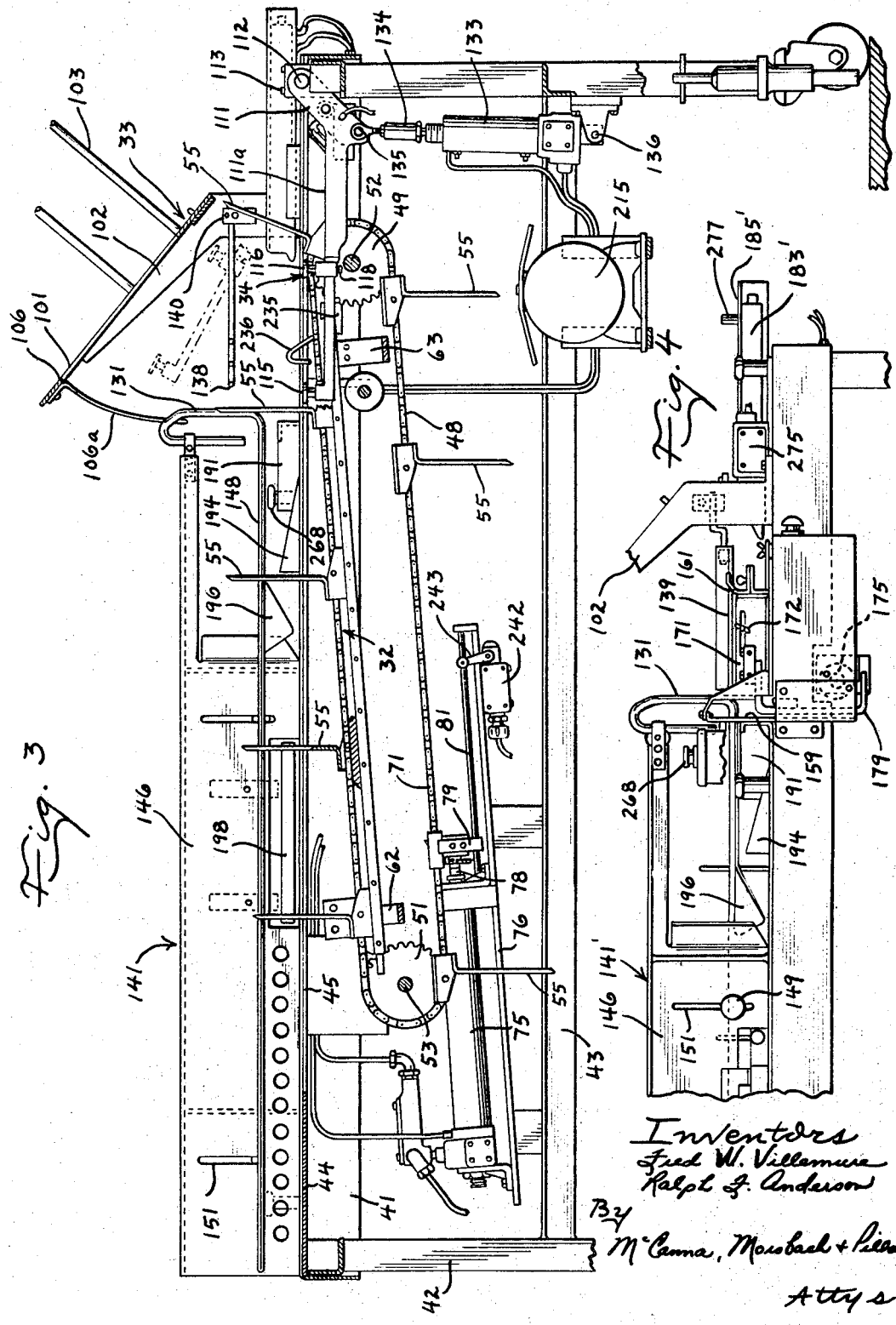

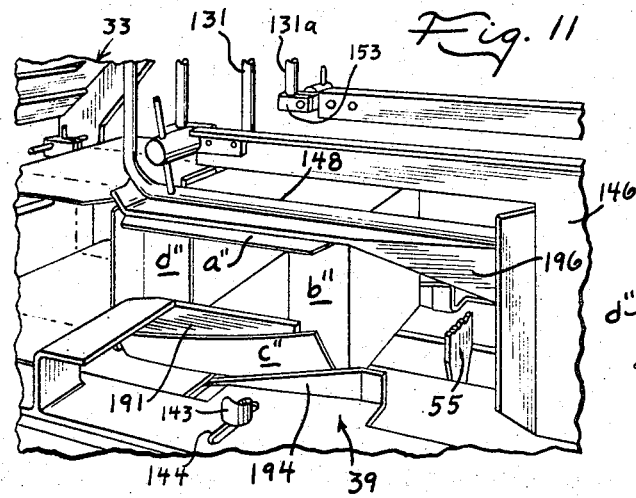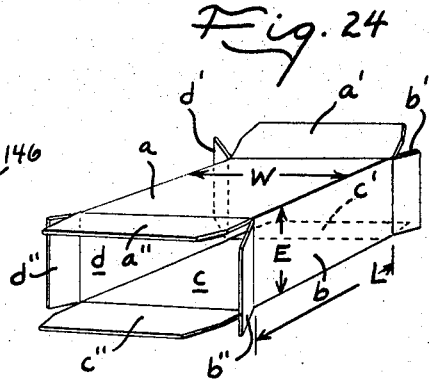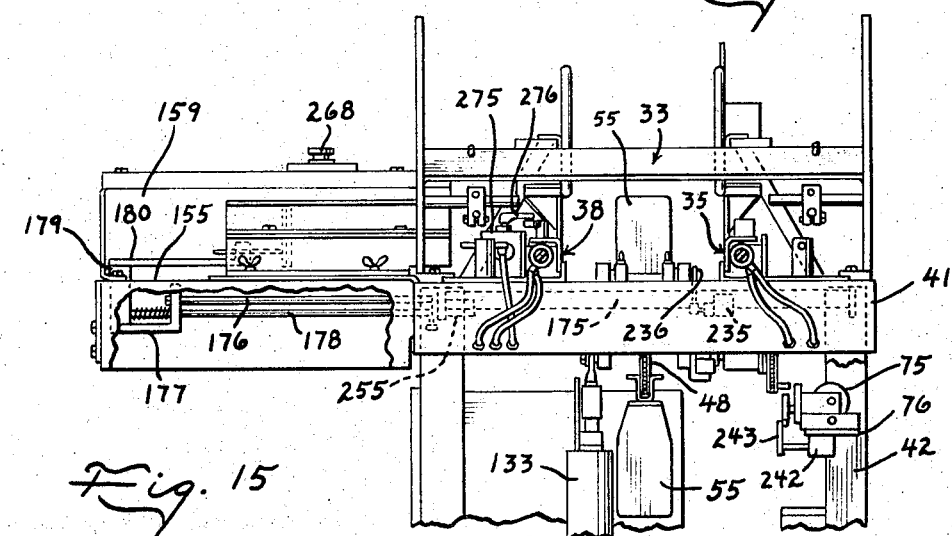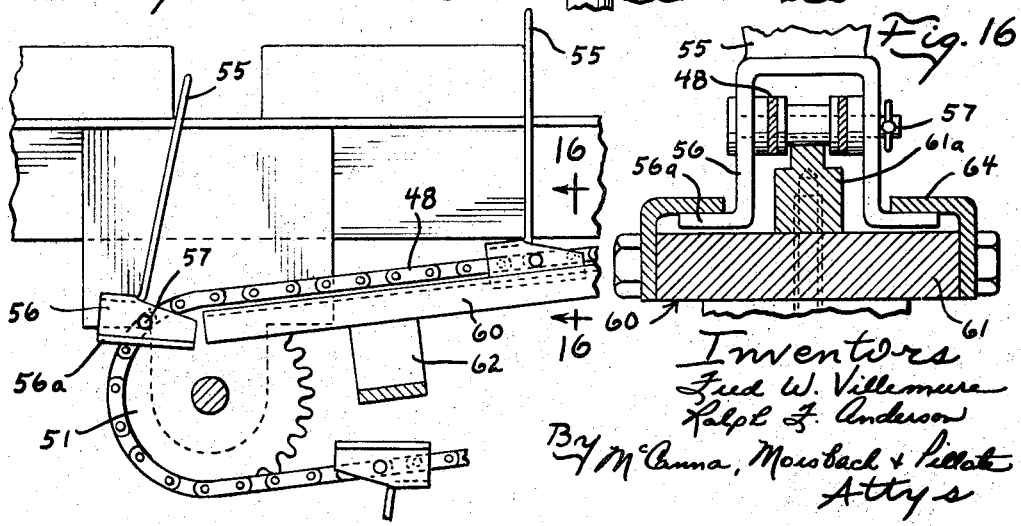

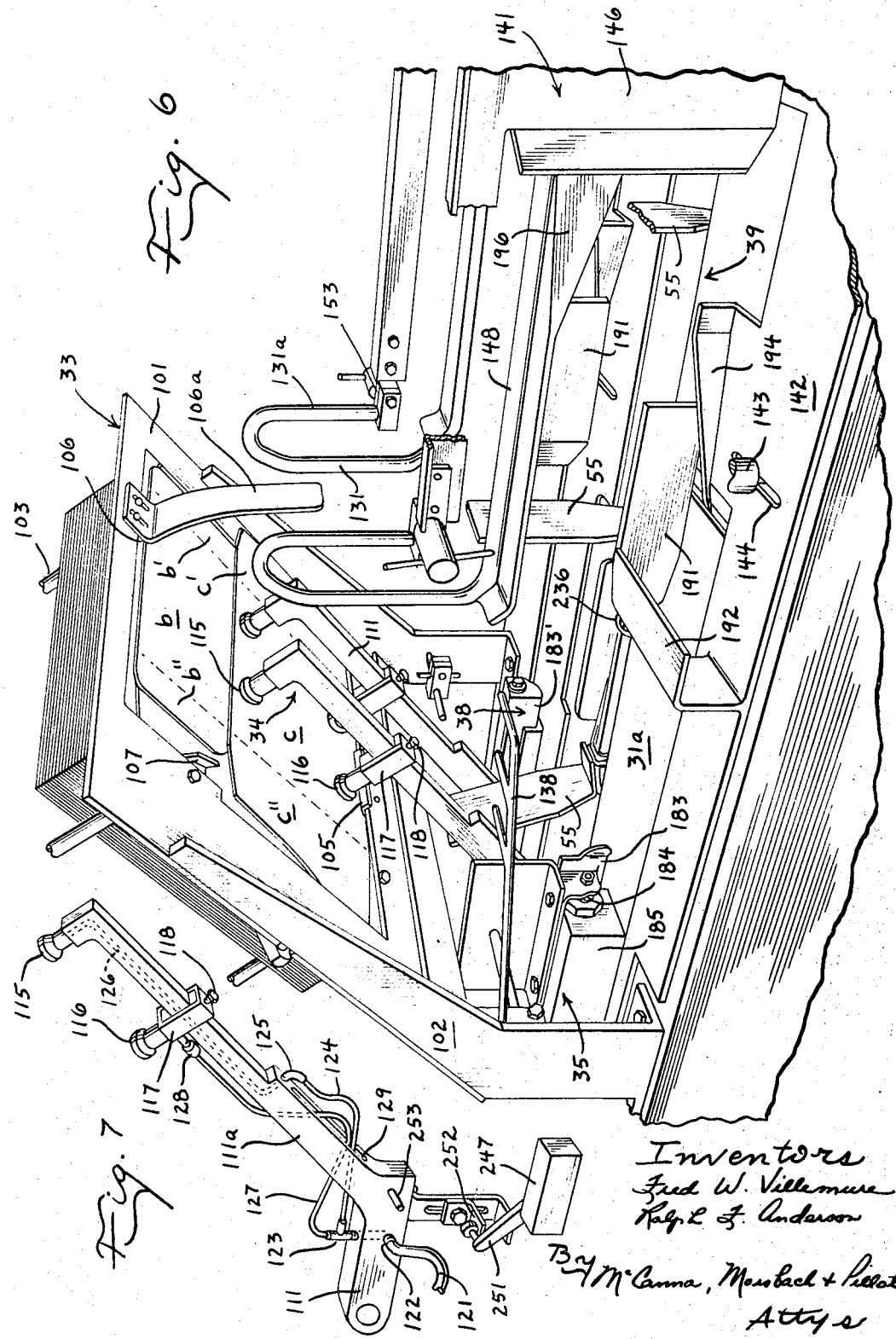

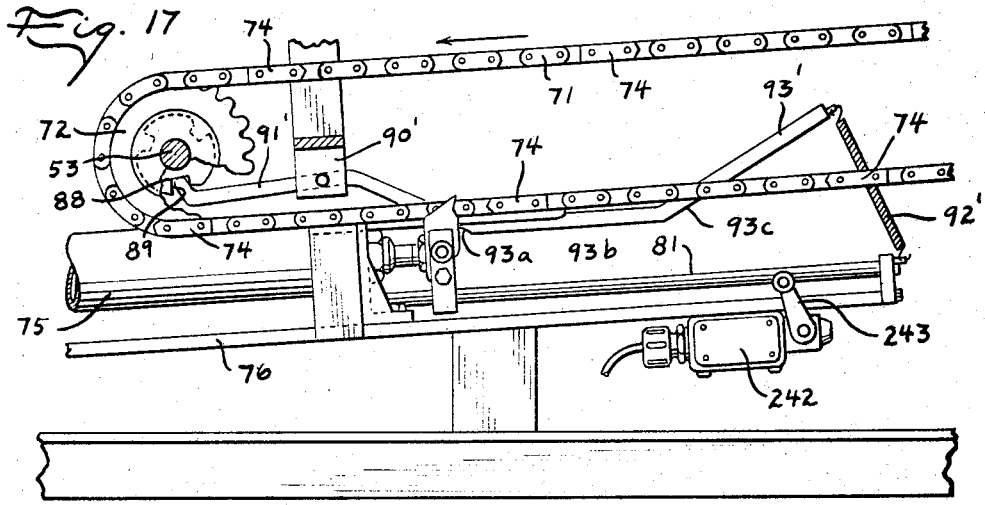
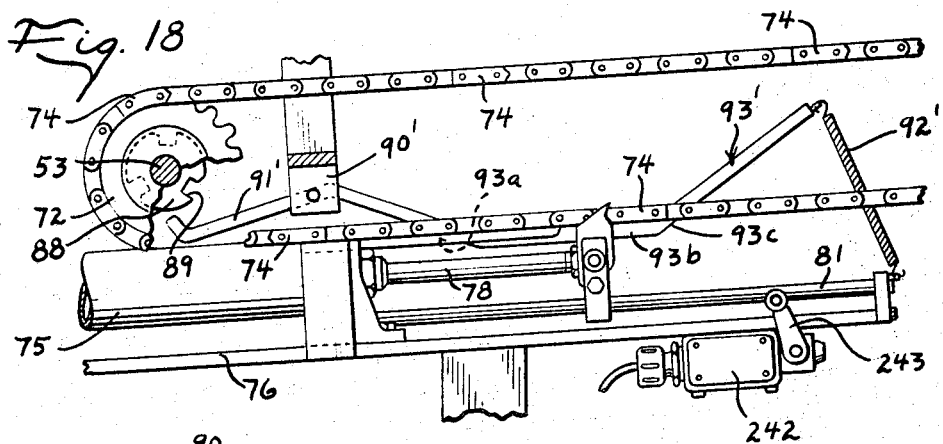
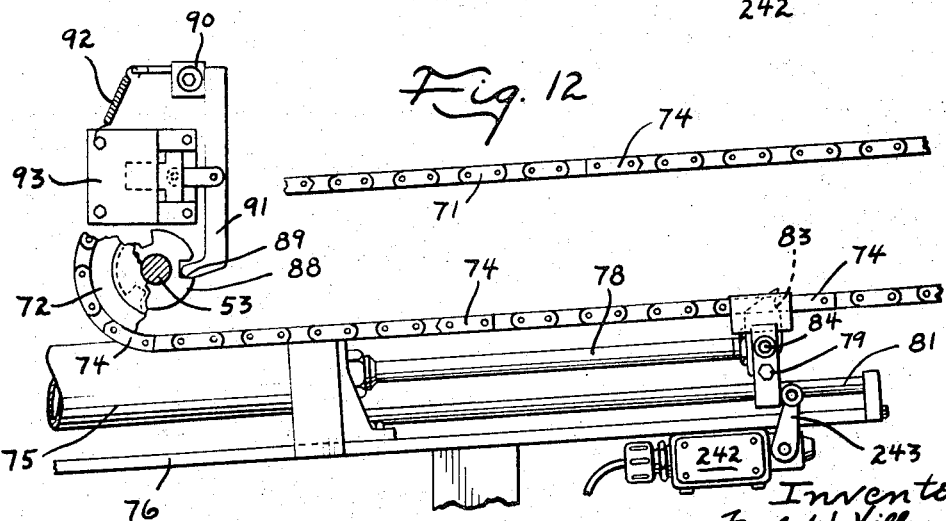

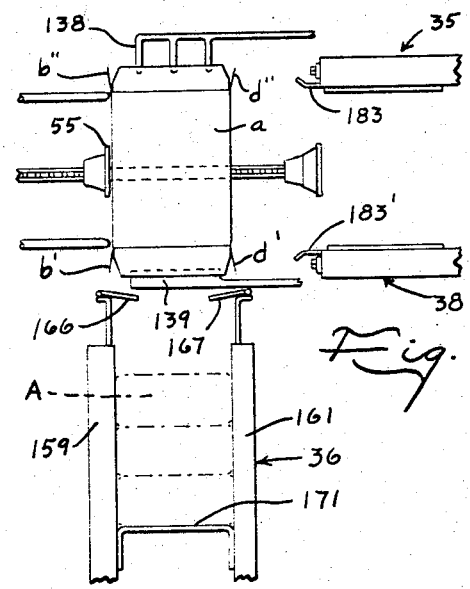
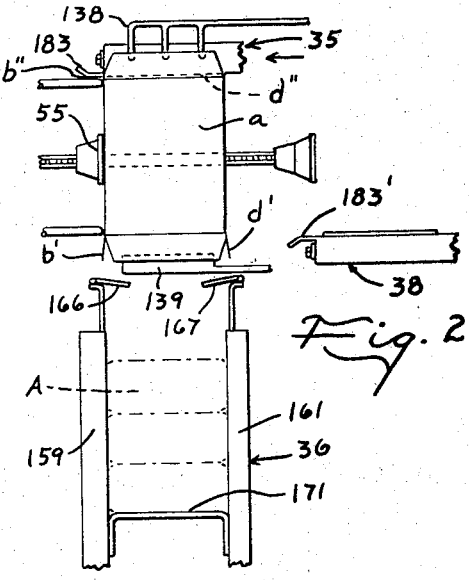
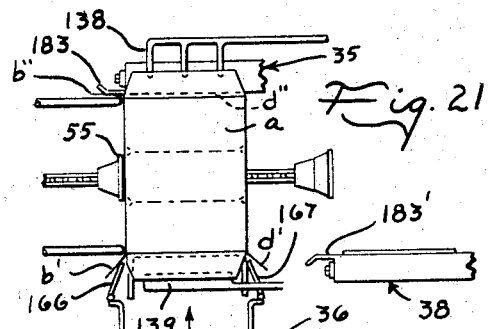
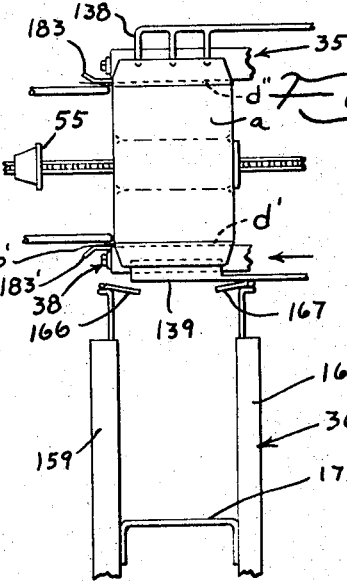
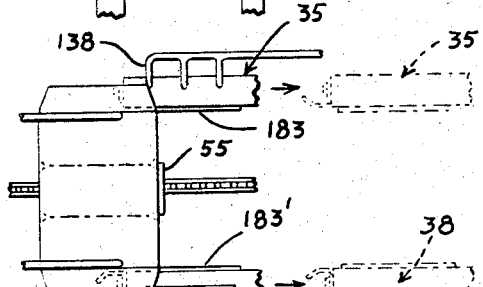
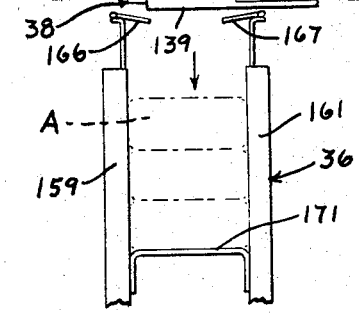

3,420,037
BOXING MACHINE
Fred W. Villemure, Rockford, Ill., and Ralph F. Anderson,
332 Calvin Park Blvd., Rockford, Ill.; said Villemure
assignor to said Anderson
Filed Aug. 22, 1966, Ser. No. 573,991
U.S. Cl. 53—186
Int. Cl. B65b 5/02
20 Claims This invention relates to apparatus for packaging articles in cartons.

An important object of this invention is to provide an apparatus for packaging articles in cartons, which effects erecting of the flattened cartons, loading of the cartons, and closing of the carton flaps in a machine of small overall size.

A more particular object of this invention is to provide an apparatus for packaging articles into cartons wherein erecting of the flattened cartons and loading of the cartons is effected at the same station to minimize the overall size of the packaging apparatus.

Another object of this invention is to provide an apparatus in accordance with the foregoing object and wherein the trailing flaps of the carton are also infolded at the loading station.

A further object of this invention is to provide an apparatus for packaging articles into cartons which is adjustable to package articles in cartons of widely different size.

Still another object of this invention is to provide an apparatus for packaging articles into cartons having an improved conveyor arrangement for advancing the loaded cartons so constructed and arranged as to minimize damage or defacing of the articles as they are advanced through the machine.

Yet another object of this invention is to provide an apparatus for packaging articles into cartons having an improved conveyor drive arrangement for intermittently advancing the conveyor and for accurately positioning the carton engaging elements of the conveyor at the article loading station.

These, together with other objects and advantages of this invention, will be more readily appreciated from the following detailed description when taken in connection with the accompanying drawings, wherein:

FIG. 1 is a perspective view of a machine embodying the present invention;

FIG. 2 is a top plan view of the machine with the carton magazine removed;

FIG. 3 is a longitudinal sectional view taken on the plane 3—3 of FIG. 2;

FIG. 4 is a fragmentary side elevational view of the packaging machine;

FIG. 5 is an end elevational view of the packaging machine, taken on the plane 5—5 of FIG. 2;

FIG. 6 is a fragmentary perspective view of the article packaging machine illustrating the carton feed apparatus in one position;

FIG. 7 is a fragmentary perspective view illustrating one of the carton feed members;

FIGS. 10 and 11 are fragmentary perspective views of the packaging machine illustrating the carton as it is advanced away from the loading station and showing the infolding of certain carton end flaps;

FIGS. 12 and 13 are fragmentary views shown partially in section and partially in elevation and illustrating the conveyor drive mechanism in different moved positions;

FIG. 14 is a fragmentary transverse sectional view taken on the plane 14—14 of FIG. 13;

FIG. 15 is a fragmentary longitudinal sectional view illustrating a portion of the conveyor on a larger scale than FIG. 3;

FIG. 16 is a fragmentary transverse sectional view taken on the plane 16—16 of FIG. 15;

FIGS. 17 and 18 are fragmentary views illustrating a modified form of conveyor drive mechanism in different moved positions;

FIGS. 19–23 are diagrammatic views illustrating different sequential steps in the opening of the carton; folding of one carton trail flap and temporarily closing one end of the carton; loading the carton; folding the other trail flap and temporarily closing the other end of the carton; and advancing the loaded carton away from the filling station;

FIG. 24 is a perspective view of a carton of a type suitable for use in the machine of the present invention;

FIG. 25 is a diagrammatic view illustrating the fluid control system for the machine; and FIG. 26 is a schematic wiring diagram illustrating the electrical control system.

Figure 8:
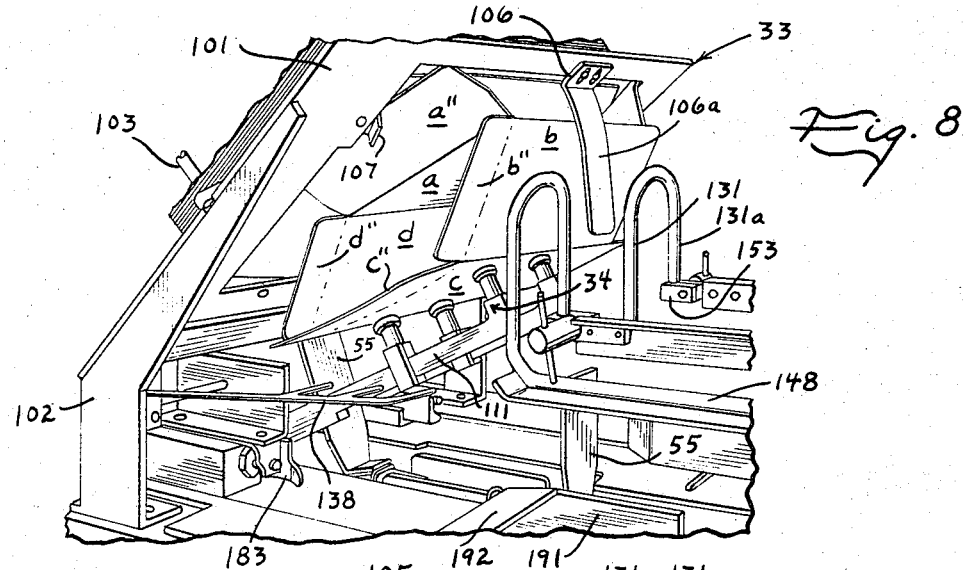
FIGS. 8 and 9 are fragmentary perspective views illustrating different stages in the erection of a flattened carton.

The packaging apparatus is arranged to package articles in generally rectangular cartons of the type shown in FIG. 24 and which include four interconnected side walls $a$, $b$, $c$ and $d$. The cartons have end closure flaps at opposite ends thereof and, in the cartons shown, include closure flaps $a'$, $a''$; $b'$, $b''$; $c'$, $c''$; and $d'$, $d''$ on the side walls $a$–$d$ respectively. As pointed out hereinafter, the cartoning apparatus of the present invention is arranged to handle cartons of widely different length L, width W and depth E. Moreover, the size and shape of the closure flaps can also vary dependent on the type of carton and seal to be employed. For example, the flaps may have a heat softenable adhesive applied to certain surfaces to enable heat sealing of the flaps when closed or, alternatively, the flaps may have glue applied thereto during passage through the machine. Further, the flaps may be formed so as to interlock when closed to avoid the necessity of either heat sealing or gluing of the flaps, all in a manner well understood in the art.

The packaging apparatus in general includes an elongated carton support 31 for supporting erected cartons with the axis of the erected cartons extending generally horizontally, and a conveyor mechanism 32 for advancing the erected cartons along the support. The support has a carton loading station 31a adjacent one end and a magazine 33 is mounted above the loading station for supporting a stack of flat carton blanks. A feed mechanism 34 is provided for withdrawing cartons from the magazine, opening or erecting the cartons and feeding the same to the loading station 31a. A first carton end closing mechanism 35 is provided for temporarily closing one end of the carton at the loading station to enable loading of that carton by an article loading mechanism 36 and, preferably, the end closing mechanism is also arranged to infold the trail flap on one end of the carton while the carton is at the loading station. A second end closing mechanism 38 is advantageously provided for temporarily closing the other end of the carton at the loading station and is preferably arranged to infold the trail flap on the other end of the carbon prior to movement of the carton away from the loading station. The conveyor mechanism is operated after the carton has been loaded to advance the loaded carton along the support and flap folding means 39 are provided to infold the other flaps on the cartons as they are advanced by the conveyor means.

Referring now more specifically to FIGS. 1–3 of the accompanying drawings, the apparatus has a support structure herein shown as comprising an upper frame 41 supported on legs 42 and a lower frame 43 for supporting other operating mechanism. The carton support means in the form of a generally horizontal platform 44 is secured to the upper frame 41 and has a longitudinally extending conveyor opening 45 intermediate the side edges thereof. A somewhat larger opening 46 (FIG. 2) is provided in the platform 44 adjacent one end of the conveyor opening 45 to allow the carton feed mechanism 34 to pass therethrough and the carton loading station 31a is located in the area where the conveyor opening and feed mechanism opening 46 intersect.

The conveyor mechanism 32 is preferably of the endless type and includes an endless chain 48 entrained over sprockets 49 and 51. The sprockets 49 and 51 are respectively nonrotatably secured to shafts 52 and 53 which are rotatably journaled adjacent the ends thereof on the frame structure, as by bearings 54 (FIG. 1). A plurality of carton engaging members 55 are attached to the chain 48 at spaced points therealong, and the carton engaging members on one run of the chain, that is the upper run as shown in FIG. 3, are arranged to project upwardly through the conveyor opening 45 in the platform 44 to advance cartons therealong. The carton engaging members 55 are preferably attached to the chain for pivotal movement relative thereto in a vertical plane extending longitudinally of the conveyor and, as best shown in FIG. 16, the carton engaging members have a U-shaped portion 56 at their lower ends which is pivotally connected as by pin 57 to the conveyor chain 48. A conveyor guide 60 is provided for maintaining the carton engaging members generally upright as they pass along the upper run of the conveyor. As shown, the conveyor guide includes an elongated support bar 61 mounted as by brackets 62 and 63 on the upper frame structure 41 and a rail 61a at the upper side of the bar 61 to engage the rollers on the conveyor chain 48 to vertically support the same. The conveyor guide also includes retaining rails 64 provided adjacent opposite sides of the bar 61 and arranged to engage lateral flanges 56a on the U-shaped portions 56 of the carton engaging members, to maintain the carton engaging members generally upright during movement along the rails.

The erected cartons with open end flaps generally lack shape stability until the end flaps are closed. The packaging apparatus is intended for use with cartons of widely different size and the carton engaging members 55 are accordingly arranged to project a substantial distance above the carton support platform 44 to engage the cartons adjacent the top and bottom thereof at least until the end flaps are closed. However, after the end flaps are closed, the cartons have better shape stability and can be pushed from adjacent their lower edges. The conveyor is advantageously arranged so as to progressively withdraw or lower the carton engaging members as they advance the cartons along the support. As best shown in FIG. 3, the shaft 53 is disposed at a level below the shaft 52 and the conveyor guide 60 is inclined downwardly in a direction away from the loading station so that the carton engaging members are progressively lowered as they are advanced. In order to further minimize defacing or damage to the cartons as the carton engaging members move around the lower sprocket 51, the conveyor guide 60 is arranged to terminate, as shown in FIGS. 3 and 15, at a point before the carton engaging members begin to move around the lower sprocket. This allows the carton engaging members 55 to pivot relative to the conveyor chain so that the carton engaging members can tilt rearwardly and slide off the end of the carton as they move around the sprocket to avoid defacing the end of the carton. Advance of the carton by each pusher is interrupted when the pusher moves off the conveyor guide and the carton remains on the platform in this advanced position until the next succeeding carton comes along to further advance the same.

A conveyor drive mechanism is provided for advancing the endless conveyor in step fashion a distance corresponding to the spacing of adjacent carton engaging members 55. For reasons pointed out hereinafter, it is necessary to accurately stop the conveyor after each stepped advance thereof so that the trailing side of the succeeding carton engaging member is located exactly at the front of the loading station 31a. An improved conveyor advancing mechanism is shown herein and includes a second endless drive chain 71 entrained over sprockets 72 nonrotatably attached to the shafts 52 and 53. The drive chain 71 and sprockets 72 are preferably made of the same size as the chain 48 and sprockets 49, 51. As viewed in FIG. 3, the chain 71 is behind the chain 48 and a portion of the latter chain is broken away to facilitate illustration of the drive chain 71. As best shown in FIG. 12, the drive chain 71 has lugs 74 at spaced intervals therealong corresponding generally to the spacing of the carton engaging members 55 on the conveyor chain, and a linear actuator 75 is provided for engaging the lugs to advance the drive chain and hence the conveyor chain in step fashion. The linear actuator is herein shown in the form of a fluid cylinder mounted on a bracket 76 conveniently supported on the lower frame 43. A piston rod 78 extends out of one end of the actuator cylinder and has a head 79 at the outer end of the rod guidably supported on a guide rod 81. As best shown in FIGS. 13 and 14, the head 79 has a chain guide block 82 thereon which receives the drive chain 71, and a pawl 83 is pivotally mounted by a pivot pin 84 on the head 79. The pawl has a stop face 83a arranged to engage a stop pin 86, and a spring 87 yieldably urges the pawl in a direction to engage the stop pin. As will be seen, the pawl engages the stop pin during extension of the head 79 so as to advance the drive chain 71 during extension of the rod 78, and the pawl is free to pivot about the pivot pin 84 during retraction of the head to bypass the succeeding drive lug on the chain 71.

The linear actuator 75 is arranged so as to have a stroke slightly in excess of the distance through which the drive chain must be advanced, and a means is provided for stopping the drive chain and hence the conveyor chain when the conveyor chain has been advanced to a preselected position. This means is preferably in the form of a stop wheel 88 which is nonrotatably secured to one of the shafts 53 and having a plurality of notches 89 therein. A releasable pawl 91 is pivotally mounted on a bracket 90 for movement into and out of engagement with the stop wheel 88, and the location and number of notches in the stop wheel is selected in accordance with the diameter of the sprockets 72 and the spacing of the lugs 74 on the drive chain so that one of the notches will register with the releasable pawl when the conveyor has been advanced to the proper position. In the preferred form shown in FIG. 12, the pawl 91 is yieldably urged to a released position as by a spring 92, and a solenoid 93 is provided for selectively moving the pawl into its conveyor stop position shown in FIG. 12. A means described hereinafter is provided for actuating the conveyor stop solenoid.

An alternative arrangement for operating the conveyor stop pawl is shown in FIGS. 17 and 18. In this embodiment, the pawl 91' is pivotally mounted on a bracket 90' for movement into and out of engagement with the stop wheel 88. A spring 92' yieldably urges the pawl into its conveyor stop position and an elongated cam 93' is provided for controlling movement of the pawl into and out of its conveyor stop position shown in FIG. 17. The cam 93' has a ramp portion 93a arranged to engage the head 79 on the piston rod during extension of the head to move the pawl 91' to a released position and an elongated dwell portion 93b arranged to ride on the head and hold the pawl in its released position until the head is extended to advance the conveyor to a position slightly in advance of its normal stopped position. A second ramp portion 93c is provided on the cam and allows the pawl to move into engagement with the stop wheel as the rod approaches its fully extended position.

The pawl will then drop into one of the notches in the stop wheel when the conveyor is advanced to a preselected position and stop further extension of the slide. During retraction of the slide, the pawl is momentarily retracted out of engagement with the stop wheel and then returns to its latched position shown in FIG. 17 when the slide is fully retracted.

The magazine 33 for storing the stack of flattened cartons is disposed above the loading station 31a and, as shown, comprises a generally rectangular frame 101 mounted as by brackets 102 on the main frame structure. The frame 101 is spaced above the carton support guide platform 44 and is inclined upwardly relative thereto in the direction of advance of the cartons by the conveyor means. Guide means herein shown in the form of rods 103 are attached to the frame to guidably support the stack of cartons. The magazine frame 101 defines an opening sufficiently large to allow the flattened cartons to pass outwardly therethrough, and carton stops 105 and 106 are provided adjacent the lower and upper edges of the frame to engage the lower and upper edges of the lowermost carton to releasably support the same in the magazine. Additionally, one or more flap engaging stops 107 may be provided for engaging one of the flaps on the upper side of the flattened carton to aid in opening the carton during withdrawal from the stack.

The carton feed means for feeding flattened cartons from the stack and for opening the same and depositing the cartons on the loading station 31a preferably comprise a pair of arms 111 nonrotatably secured to a shaft 112 which is rotatably journaled in bearings 113 on the frame 41 (FIG. 3). The shaft axis 112 is preferably located at a point adjacent the apex of the angle between the magazine frame 101 and the carton support platform 44, and the arms 111 are angulated intermediate their ends so that the end portion 111a thereof extends generally horizontally at a level below the platform 44, when the arms are in their lowered position shown in FIG. 3. Vacuum cups are provided on the arms for gripping the end container in the magazine and for pulling the same downwardly to deposit it on the loading station and, in order to adapt the machine for handling cartons of different size, one of the vacuum cups on each arm shown at 115 may be fixedly mounted on the respective arm 111, and the other vacuum cup 116 mounted for adjustment longitudinally of the respective arm, as by a U-shaped bracket 117 which is slidable along the arm and adapted to be locked in adjusted position by a screw 118. As best shown in FIG. 7, a vacuum line 121 is connected to each of the arms 111 by a fitting 122 at a point adjacent the pivot axis of the arms. Vacuum is supplied to the fixed vacuum cup 115 on each arm by way of a fitting 123 mounted on the respective arm in communication with the fitting 122 and through a flexible line 124 and fitting 125 connected to the outer arm portion 111a and which communicates with a passage 126 in the arm portion 111a leading to the fixed vacuum cup 115. Vacuum is supplied to the adjustable vacuum cup 116 through a flexible line 127 also conveniently connected to the fitting 123 and which is otherwise connected to a fitting 128 on the adjustable bracket 117, to communicate with the vacuum cup 116. As shown, the fitting 123 is located at the top of the arms 111, and the arms are advantageously formed with an opening or cavity 129 in the portion 111a to receive the loop of the flexible line 127 as the cup 116 is adjusted along the arm, and to also allow passage of the vacuum line 124 therethrough to the fitting 125 at the underside of the arm. Vacuum is applied to the cups 115 and 116 in a manner described more fully hereinafter. As will be seen from FIG. 6, the fixed vacuum cups 115 are arranged to engage the carton side c adjacent its juncture with that carton side b that leads during advancement of the carton to the machine, and the adjustable cups 116 are adjustably positioned so as to engage the carton side c adjacent its other edge.

A means is provided for squaring or erecting the cartons as they are moved off the magazine and onto the loading platform. As shown, an arcuate finger 106a is provided adjacent the upper edge of the magazine and extends downwardly with the lower end of the finger spaced radially from the pivot shaft 112 of the carton feed arms a distance substantially less than the upper end of the arms and such that the finger 106a engages the lead side b of the carton as it is moved downwardly to deflect the same at an angle relative to the bottom side c of the carton, as shown in FIG. 8. Stationary cam members 131 are provided and mounted in a manner described hereinafter to also engage the lead side b of the carton as it is moved downwardly to complete squaring of the same and to guide the carton in front of the carton engaging member 55 at the loading station. The carton feed arms are conveniently raised and lowered by a linear actuator 133 best shown in FIG. 3 in the form of a cylinder pivotally mounted at 136 on the lower frame 43 and having its piston rod 134 connected at 135 to the arms 111 intermediate the ends thereof to raise and lower the arms in response to extension and retraction of the linear actuator. A means, described hereinafter, is provided for controlling operation of the carton feed means.

Figure 9:
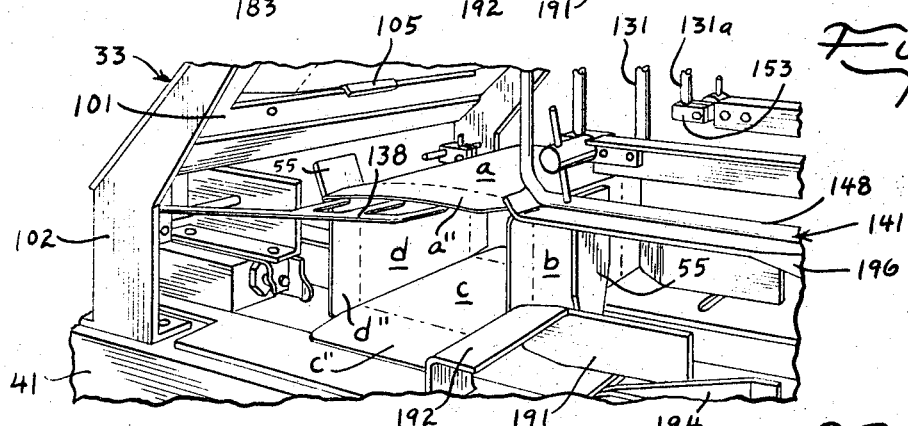
Figure 10:
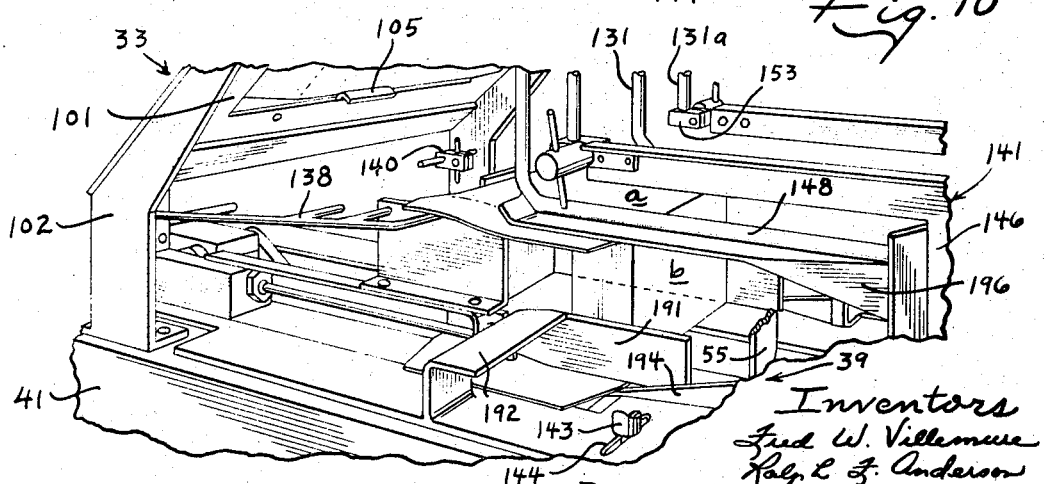

The carton, when deposited on the loading station, is opened and squared as shown in FIG. 9, and first and second upper flap holding finger assemblies 138 and 139 are mounted as by brackets 140 on the magazine support brackets 102 and positioned to respectively engage the upper end flaps a″ and a′ on the upper side a of the carton to hold the same in a raised position as shown in FIGS. 9 and 19–23.

The article packaging apparatus has first and second lateral carton guides and end folding apparatus designated 141 and 141′ disposed at opposite sides of the path of travel of the cartons by the conveyor means for laterally guiding the cartons and for infolding certain flaps on the cartons. The first and second lateral carton guide means are similarly constructed and are substantially mirror images of each other, and like numerals are used to designate corresponding parts. The lateral carton guides are advantageously made laterally adjustable to accommodate cartons of different size, and each includes a base plate 142 mounted on the carton support platform 44 and adapted to be locked in laterally adjusted position by hand operated locking screws 143 which extend through transverse slots 144 in the base plates. As shown in FIG. 2, the base plates extend along substantially the entire length of the platform 44 and have upstanding lateral carton guide portions 146 extending from a point adjacent the loading station to the outlet end of the platform. Upper carton guide rails 148 are mounted at the inner sides of the lateral carton guides 146 for vertical adjustment relative thereto as by hand operated lock screws 149 which extend through vertically elongated slots 151 in the lateral carton guides and into the upper guide rails. The ends of the upper carton guide rails are preferably bent upwardly to form to aforementioned cams 131, and the cams are provided with downturned ends 131a which are vertically adjustably secured to the lateral carton guides as by clamp blocks 153. With this arrangement, the lateral carton guides can be laterally adjusted toward and away from each other, and the upper carton guide rails can be vertically adjusted relative to the platform to accommodate cartons of different length and depth.

The articles are loaded into the cartons at the loading station from one end thereof by the loading apparatus 36, and, as shown in FIGS. 2 and 5, a stationary platform 155 is mounted on the frame 41 at one side of the loading station 31a and extends laterally therefrom. The cartons at the loading station rest on the top of the platform 44 at the loading station 31a and in order to facilitate guiding of the articles over the end flap c′ on the carton at the loading station, a thin article support plate 156 (FIGS. 1 and 2) is mounted to overlie the platform 155 and extend inwardly to a point adjacent the lower flap c' on the carton. As shown in FIG. 2, the plate 156 is adjustable in a direction transverse to the conveyor as by a lock screw 157 that extends through a slot 158 in the plate. A fixed lateral article guide 159 is mounted on the platform and extends in approximately transverse alignment with the carton engaging member 55 which engages the lead side b of the carton at the loading station. A second laterally adjustable guide 161 is spaced laterally from the guide 159 and is adjustable toward and away therefrom as by locking screws 162 which extend through slots 163 in the base portion of the guides. Lead and trail flap expanding fingers 166 and 167 are swingably mounted on brackets 168 and 169 attached to the article guides 159 and 161 respectively. The lead and trail flap expanding fingers are yieldably urged by springs (not shown) to the inwardly directed position shown in FIG. 2 and are movable outwardly as the articles are pushed therethrough to fold the lead and trail flaps on the carton outwardly and to facilitate guiding of the articles into the carton. The lead and trail flap expanders are adjustable laterally of the conveyor, and for this purpose the brackets 168 and 169 are longitudinally adjustably mounted on the respective article guides to enable positioning of the flap expanders adjacent the end of the carton at the loading station.

The article loading apparatus 36 also includes a pusher 171 mounted for reciprocation longitudinally of the article guides to push the articles A into the carton at the loading station. The pusher is advantageously formed in two relatively adjustable sections as best shown in FIG. 2, which are adapted to be locked in adjusted position by a lock screw 172. The pusher substantially spans the space between the article guides and is adjusted when the article guides are laterally adjusted. The pusher may be manually reciprocated but is preferably power operated. For this purpose, a linear actuator 175 shown in FIGS. 2 and 5 in the form of a cylinder is mounted on the underside of the frame 41 and has its piston rod 176 connected to a head 177. The head is guidably supported on a guide rod 178 mounted at the underside of the platform 155, and the head has an arm 179 that extends above the platform and which terminates in an end portion 180 paralleling the path of movement of the pusher 171. The pusher is adjustably secured to the end portion 180 as by clamp brackets 181 to enable adjustment of the forward position of the pusher in accordance with the size of the carton being loaded. A means described hereinafter is provided for operating the article loading apparatus 36.

The first carton end closing apparatus 35 is provided for temporarily closing the end of the carton opposite the article loading apparatus to prevent endwise movement of the carton and to also prevent articles from passing outwardly from the other end of the carton during loading, and this end closing apparatus is also advantageously arranged to infold the trailing flap on the end of the carton. The first end closing apparatus includes a member 183 having a length at least sufficient to span the open end of the carton. The end closing member is supported for reciprocation along a path generally paralleling the path of movement of the conveyor and, as shown, is connected to the piston rod 184 of a fluid actuator 185 advantageously mounted on the base plate 142 of the lateral carton guide 141 to enable adjustment of the end closing member laterally with the lateral carton guide. The member 183 is advantageously formed of generally L-shaped cross-section to guidably engage the outside of the generally rectangular fluid actuator 185 and prevent turning of the member 183 during extension and retraction of the end closing member. The second end closing apparatus 38 is preferably constructed similar to the apparatus 35 and includes an end closing member 183' reciprocated by a fluid actuator 185' mounted on the base plate 142 of the other lateral carton guide 141'. The end closing apparatus 38 is thus laterally adjustable with the guide 141' and is supported for reciprocation along a path generally paralleling the lateral guide face 146 thereof into and out of an operative position closing the other end of the carton, after loading of the same. As will be seen, the end closing apparatus 35 and 38 are normally retracted as shown in FIG. 2 and are extended, that is moved to the left as viewed in FIG. 2, to close the respective ends of the carton. During extension, the members 183 and 183' respectively engage the trailing flaps d" and d' at the trailing side of the carton to infold the same and partially close the carton. The infolding of the trailing flaps at the carton leading station tends to rigidify the erected cartons and hold the same in a generally squared condition.

The cartons, after loading at the loading station, are advanced by the conveyor mechanism along the support platform between the lateral carton guides 141, 141'. Flap folding plows are provided on the lateral carton guides to infold the remaining flaps on the cartons during advance of the same. The plows for each end of the carton are of similar construction, and like numerals are used to designate corresponding parts. As previously described, the trailing flaps on the carton are infolded at the loading station by the aforementioned end closing members 183, 183'. The lead flaps are infolded as the cartons are advanced away from the loading station by plows 191 attached by a bracket 192 to the base plate of the respective lateral carton guide. The plows are mounted so that their lower edge rides over the flaps c" and c' at the underside of the carton and engages the lead flaps b" and b' respectively to infold the same. A lower flap folding plow 194 is provided on each of the lateral carton guides and is inclined upwardly and inwardly with respect to the path of travel of the flaps to engage the lower flaps c" and c' to fold the same upwardly and inwardly. An upper flap folding plow 196 is also provided on each of the upper carton guide rails 148 and inclined downwardly and inwardly to engage the upper flaps a" and a' to fold the same downwardly and inwardly. The upper flap folding plows are vertically adjustable with the upper carton guide rails to accommodate cartons of different depth. As best shown in FIG. 6, the flap folding plows 194 and 196 are offset somewhat in a direction longitudinally of the path of movement of the conveyor to effect sequential folding of the bottom and top flaps. As is apparent, the particular shape or form of the flap folding plows will vary with different types of flaps and flap arrangements. Moreover, different arrangements can be provided on the cartons for holding the infolded flaps in a closed position. Thus, the flaps can be of the interlocking type or can be adhesively closed or closed by heat sealing. In the embodiment illustrated, a means such as heat sealing heads 198 are provided on the lateral carton guides 141, 141' to heat seal the ends of the cartons as they are advanced by the conveyor.

Reference is now made to FIGS. 25 and 26 showing the fluid operating system for the several fluid actuators and the electrical control system therefore. As diagrammatically shown in FIG. 25, air under pressure controlled by a regulator 201 is reversibly supplied through a flow reversing valve 202 and lines 203a and 203b to the conveyor actuator 75. Air, also conveniently under the control of the regulator 201, is also reversibly supplied through a flow reversing valve 205 and lines 206a and 206b to the carton feed actuator 133. Fluid from the regulator 201 is also supplied through a flow reversing valve 208 and lines 209a and 209b to the article loader actuator 175. Air under pressure from a regulator 210 is supplied through a flow reversing valve 211 and lines 212a and 212b to the actuator 185 for the first end closing member 183, and air is reversibly supplied through a valve 213 and lines 214a and 214b to the actuator 185' for the second end closing member 183'. A vacuum generating means such as a pump 215 is provided for the grippers, and a two-way vacuum control valve 216 is provided for connecting the line 121 leading to the vacuum cups alternately to the vacuum pump 215 and to a source 218 of air under pressure.

The several valves are conveniently electrically operated and have electro-responsive operators for moving them from one position to the other. In the embodiment illustrated, the valves 202, 205, 208, 211 and 213 are of the bi-stable type, viz., are moved to one position in response to actuation of one electro-responsive operator and remain in that position until the other electro-responsive operator is actuated to return the valve to its first mentioned position. The valve 216 has a single electro-responsive operator 216a and is of a type which normally communicates the vacuum pump 215 with the line 121 and which is operative so long as the actuator 216a is energized to communicate the air supply source 218 with the line 121.

The electrical control system as shown in FIG. 26 includes a manually operable main off-on switch 225 for controlling application of power from the secondary of a transformer 226 to main power lines 227 and 228. A pilot light 229 is provided to indicate when the power is on. A second manually operable switch 231, conveniently operated in unison with the switch 225, is connected to apply power from line 228 to a relay actuator 232 for operating a motor start relay 233 to start the motor 215a for the vacuum pump 215.

A switch 235, herein shown as the normally closed type, is provided at the loading station for detecting when a carton is in position and, as best shown in FIG. 3, has a carton engaging finger 236. The finger 236 is depressed when a carton is in position and opens the normally closed switch 235. The switch 235 is connected to apply power from line 228 to a relay operator 238 when the switch is closed. The relay operator 238 controls normally open relay contacts 239 and normally closed relay contacts 241 and, when energized, closes contacts 239 and opens contacts 241. A switch 242 is provided for detecting when the conveyor actuator 75 reaches its extended position and, as shown in FIGS. 3, 12, 17 and 18, the switch 242 is mounted so that its actuator 243 extends into the path of movement of the head 79 on the conveyor actuator piston, when the latter is extended. The switch 242 is of the normally open type and is connected to apply power from the line 228 through a conductor 244 to each of the electro-responsive operators 202b, 211b, 213b, 205b and 93. The valve operator 202b is operative when energized to operate valve 202 to a position to retract the conveyor actuator 75, and valve operators 211b and 213b are operative when energized to operate valves 211 and 213 to retract the first and second end closing actuators 185 and 185' respectively. Valve operator 205b when energized operates valve 205 to raise the carton feed actuator 133 and pawl operating solenoid 93 is operative when energized to move the stop pawl 91 to its stop position shown in FIG. 12. A switch designated generally by the numeral 247 is provided for detecting when the carton feed members are in their raised position and, for reasons which will become apparent hereinafter, the switch is preferably of the type having dual switch elements 248 and 249 mechanically interconnected so as to open one of the switch elements such as 249 when the other switch element is closed, and vice versa. The switch 247 is mounted, as best shown in FIG. 7, adjacent the carton feed arms 111 and has an actuator 251 operated by fingers 252 and 253 carried by the arms 111. The switch is of the bi-stable type which is moved by finger 253 to the position shown in FIG. 26, closing element 248 and opening switch element 249 when the arms are lowered. The switch 247 remains in the position shown in FIG. 26 until the arms are substantially fully raised, and at that time the finger 252 operates the switch 247 to its other position, closing element 249 and opening element 248. Switch 247 then remains in said other position until the arms 111 are substantially lowered and the finger 253 moves it back to the FIG. 26 position.

A switch 255 of the normally open type is provided for detecting when the article loading actuator 175 is in its forward or extended position. Ths switch is conveniently positioned as shown in FIGS. 2 and 5 at the underside of the platform 155 and in the path of movement of the head 177 on the rod of the loading actuator to be operated to its closed position in response to extension of the article loading actuator 175. As shown in FIG. 26, the switch 255 is connected to apply power from the line 228 through a line 258 to valve operators 208b, 213a and 216a when the switch 255 is closed. The valve operator 208b operates the valve 208 for the article loading actuator to retract the article loader, and the valve operator 213a operates valve 212 to extend the actuator 185' of the second end closing mechanism 38, while the valve operator 216a operates the vacuum control valve 216 to shut off the vacuum and apply air to the vacuum cups of the carton feed mechanism. The switch 255 is also arranged, when closed, to apply power through a line 261 to a latching relay operator 262 which operates to open the normally closed relay contacts 263. A latch mechanism, diagrammatically shown at 264, will hold the contacts 263 in their open position until released by a latch release operator 265. The switch element 248 of the switch 247 is connected in series with a normally open cycle switch 268 and with the normally closed latching relay contacts 263 to a line 269 connected to the normally open and normally closed contacts 239 and 241 of relay operator 238. Normally closed contacts 241 control the application of power to the valve operators 208a and 211a. The switch element 249 of switch 247 is connected to apply power from the line 228 through a line 272 to the aforementioned latch release operator 265 and to a valve operator 205a. The operator 205a operates valve 205 to lower the article feed members. A switch 275 of the normally open type is mounted in position to detect when the second end closing mechanism 38 is in its extended or forward position and, as shown in FIG. 2, has an actuator 276 arranged to be engaged by a member 277 on the second end closing member 183', when the latter is in its extended position. The switch 275 is connected to apply power from line 228 through a line 278 to a valve operator 202a for operating the conveyor actuator valve 202, to move the conveyor actuator 75 to its extended position. At the start of an operating cycle, the carton feed mechanism 34 is normally positioned with the arms 111 in their lowered position shown in FIG. 3, and the conveyor actuator 75 is normally retracted. In addition, the actuators 185, 185' for the first and second end closing members are in their retracted position, and the actuator 175 for the article loading apparatus is normally retracted so that the pusher 171 is spaced from the conveyor to allow loading of articles in front of the pusher. After the articles have been deposited in front of the pusher 171, the manually operable cycle switch 268 is manually operated to close the same. If a carton is in position on the loading station as detected by the carton detector switch 235, the switch 235 will be opened to deenergize relay 238 whereby relay contacts 239 and 241 thereof can move to their respective normally open and normally closed positions. Under these conditions, closing of cycle switch 268 will apply power through the normally closed relay contacts 263 and switch 241 to the valve operators 208a and 211a. Energizing of valve operator 208a operates valve 208 to extend the article loading actuator 175, and energization of valve operator 211a operates valve 211 to extend actuator 185 for the first end closing member 183. On the other hand, if no carton is in position at the loading station, the carton switch 235 will be closed thereby energizing the relay 238 to close contacts 239 and open contacts 241. Under these conditions, closing of the cycle switch 268 will not operate to extend the article loading actuator or the actuator for the first end closing member, but will instead apply power through relay contact 239 to the valve operators 202b, 211b, 213b, 205b and 93. Operation of valve operator 205b operates to raise the carton feed actuator 133 to pick off a succeeding carton from the magazine and deposit the same on the loading station.

As previously described, closing of the cycle switch 268 will operate to extend the article loading actuator 175 to load articles into the carton. When the loading actuator is extended, it operates the switch 255 to close the same and closing of switch 255 operates the latching relay operator 262 to open the latching relay contacts 263 to prevent a subsequent cycle. In addition, closing of switch 255 operates valve operators 208b, 213a and 216a. Valve operator 208b, when energized, operates valve 208 to retract the article loading actuator 175. Valve operator 213a, when energized, operates valve 213 to extend the actuator 185' for the second end closing member to close the second end of the carton. Valve operator 216a, when energized, operates valve 216 to cut off the vacuum to the vacuum cups and to apply air under pressure thereto to positively release the carton at the loading station. The carton feed arms 111 are preferably adjusted so that, when in their lowered position, the faces of vacuum cups 115 and 116 are disposed at a level slightly below the loading platform so that, when the vacuum is cut off, the carton separates slightly from the vacuum cups to prevent the vacuum cups from again gripping the carton at the loading station when the vacuum is again turned on.

When the second end closing member 185' moves to its extended position, it closes switch 275 and energizes valve operator 202a to operate valve 202 and extend the conveyor actuator 75. When the conveyor actuator 75 is extended, it operates switch 242 to close the same and energize valve operators 202b, 211b, 213b, 205b and 93 to respectively retract the conveyor actuator 75; retract the actuators 185 and 185' for the first and second end closing members; retract the carton feed actuator 133, and energize the solenoid 93 which moves the conveyor stop pawl to its conveyor stop position.

The operational sequence of the packaging apparatus is diagrammatically illustrated in FIGS. 19–23. The carton feed mechanism 34 is first operated to withdraw a flattened carton from the stack and to square or erect the carton while depositing the same at a loading station. As will be seen from FIG. 19, the trailing side of one of the carton engaging members is positioned to engage the lead side b of the carton at the loading station to aid in squaring the same. The first flap tucking and end closing mechanism 35 is then operated to close one end of the carton and infold the trailing flap d'' as shown in FIG. 20, and the article loader 36 is thereafter operated as shown in FIG. 21 to push articles into the carton from the other end thereof. After the articles are loaded in the carton, the article loader is retracted and the second flap tucking and end closing mechanism 38 moves across the other end of the carton to close the same. The first and second flap tucking and end closing mechanisms are maintained in their extended position until the conveyor has at least substantially moved the loaded carton away from the loading station. In this manner, the first and second flap tucking members maintain the trailing flaps closed during movement away from the closed position and until the succeeding flaps on the carton are at least partially closed. As will be seen from FIG. 21, the flap expanding members swing outwardly to engage the lead and trail flaps on the end of the carton to expand the same as the articles move into the end of the carton. The vacuum control valve 216 is not operated to shut off the vacuum to the vacuum cups of the carton feed mechanism until after the first trailing flap d'' is closed and the articles have been loaded in the carton.

What is claimed as new is:

1. An apparatus for packaging articles in cartons of the type having four interconnected side walls and end closure flaps on at least some of the side walls comprising, means defining an elongated support for supporting erected cartons with the axis of the erected cartons extending generally horizontally, conveyor means having spaced carton engaging members for advancing the erected cartons in one direction in a path along said support means, said carton support means having a carton loading station, a magazine for supporting a stack of cartons in flattened condition above said loading station, carton feed means for withdrawing a flattened carton from the end of the stack; opening the flattened carton; and depositing the opened carton on said support means at said loading station, a first carton end closing means mounted for movement into and out of position at a first end of the opened carton at the loading station to close said first end of the carton sufficient to prevent articles from passing outwardly therethrough, loading means for loading articles into the carton at said loading station through a second end thereof, a first operating means for operating said carton feed means to feed a carton to said loading station, a second operating means for operating said first end closing means to close said first end of the carton at the loading station, a third operating means for operating said conveyor means to advance a loaded carton away from said loading station and along said path, and means for infolding certain flaps on said first and second ends of the cartons as they are moved along said path by said conveyor means.

2. An apparatus for packaging articles in cartons of the type having four interconnected side walls and end closure flaps on at least some of the side walls comprising, means defining an elongated support for supporting erected cartons with the axis of the erected cartons extending generally horizontally, conveyor means having spaced carton engaging members for advacing the erected cartons in one direction in a path along said support means, said carton support means having a carton loading station, a magazine for supporting a stack of cartons in flattened condition above said loading station, carton feed means for withdrawing a flattened carton from the end of the stack; opening the flattened carton; and depositing the opened carton on said support means at said loading station, a first flap tucking and end closing member mounted for movement into and out of an operative position extending across a first end of the carton at said loading station to infold the flap on said first end of the carton which is at the trailing side of the carton when the latter is thereafter advanced in said one direction and to close said first end of the carton sufficient to prevent articles from passing outwardly therethrough, loading means for loading articles into the carton at said loading station through a second end thereof, a first operating means for operating said carton feed means, to feed a carton to said loading station, a second operating means for operating said first flap tucking and end closing member to close said first end of the carton at said loading station, a third operating means for operating said conveyor means to advance a loaded carton away from the loading station, and means for infolding certain flaps on the first and second ends of the cartons as they are advanced by the conveyor means along said path.

3. An apparatus according to claim 2 wherein said first flap folding and end closing member is mounted for reciprocation in a direction generally paralleling said path of movement of the cartons.

4. An apparatus according to claim 2 wherein said second operating means is operative to maintain said first flap tucking and end closing member in said operative position thereof until said conveyor means have advanced the loaded carton substantially away from the loading station whereby to guidably maintain the trail flap on the first end of the carton in its folded condition.

5. An apparatus according to claim 2 including a second flap tucking member mounted for movement into and out of an operative position extending across said second end of the carton at said loading station for infolding the flap on said second end of the carton which is at the trailing side of the carton when the latter is thereafter advanced in said one direction, and a fourth operating means for moving said second flap tucking member to said operative position after said loading means has loaded articles into the carton at the loading station.

6. An apparatus according to claim 5 wherein said first and second flap tucking members are mounted for reciprocation in a direction generally paralleling said path of movement of the cartons.

7. An apparatus according to claim 5 wherein said second and fourth operating means are operative to maintain said first and second flap tucking members in said operative positions thereof until said conveyor means has advanced the loaded carton substantially away from the loading station whereby to guidably maintain the trail flaps on the ends of the carton in their folded condition.

8. An apparatus according to claim 2 wherein said carton feed means comprises vacuum operated gripper means movable from a raised position engaging the end article in the stack to a lowered position adjacent the level of said carton support at the loading station to move the carton from the stack to the loading station, and means for controlling application of vacuum to said vacuum operated gripper means to apply vacuum to the gripper means during movement from said raised to said lowered position thereof and to cut-off vacuum to the gripper means after the first flap tucking and end closing member has moved to a position closing said first end of the carton and before said conveyor means is operated to move the loaded carton away from the loading station.

9. An apparatus according to claim 2 including control means for operating the carton feed means; the first flap tucking and end closing member; the loading means; and the conveyor means to feed a carton to the loading station; close the first end of the carton at the loading station; load the carton at the loading station, and thereafter advance the loaded carton away from the loading station.

10. An apparatus for packaging articles in cartons of the type having four interconnected side walls and end closure flaps on at least some of the side walls comprising, means defining first and second elongated carton support guides having an elongated opening therebetween, conveyor means below said carton support guides having spaced carton engaging members extending upwardly through said opening for advancing erected cartons along said carton support guides, said carton support guides having a carton loading station, a magazine for supporting a stack of cartons in a flattened condition above said loading station, carton feed means for withdrawing a flattened carton from the end of the stack; opening the carton; and depositing the opened carton on the carton support guides at the loading station, first and second lateral carton guide means mounted on said support guides at opposite sides of said opening for adjustment toward and away from each other to accommodate cartons of different size, first and second flap tucking and end closing members respectively mounted on said first and second lateral carton guides for lateral adjustment therewith, said first and second flap tucking and end closing members being movable relative to the lateral carton guides into and out of operative positions respectively extending across first and second ends of the carton at the loading station to infold the flaps on the respective ends of the cartons which are at the side of the carton that trails when the latter is thereafter advanced in said one direction and to close the respective ends of the carton sufficient to prevent articles from passing out through the carton ends, means for operating said carton feed means to feed a carton to the loading station, means for operating said first flap tucking and end closing member to close the first end of the carton, means for loading articles into the carton at the loading station, means for operating the second flap tucking and end closing member to close the second end of the carton after it has been loaded, means for operating said conveyor means to advance a loaded carton away from the loading station and along said path, and means on said first and second lateral carton guides for folding certain flaps on the respective ends of the cartons as the cartons are advanced along said path.

11. An apparatus according to claim 10 wherein the operating means for said first and second flap tucking and end closing members maintains the same in their operative position at least until said conveyor means has substantially advanced the loaded carton away from the loading station.

12. An apparatus according to claim 10 wherein said first and second flap tucking and end closing members are mounted for reciprocation along paths generally paralleling said path of movement of the cartons by said conveyor means.

13. An apparatus for packaging articles in cartons of the type having four interconnected side walls and end closure flaps on at least some of the side walls comprising, means defining first and second elongated carton support guides having an elongated opening therebetween, an endless type conveyor including an endless chain having one run extending generally lengthwise of said opening below said carton support guides, a plurality of carton engaging members attached to said chain at spaced points therealong, the carton engaging members on said one run of said chain extending upwardly through said opening to advance cartons along the carton support guides, means for feeding cartons onto said carton support guides adjacent one end of said opening, characterized in that the chain has means supporting said one run thereof inclined downwardly away from said carton support guide in a direction from said one end of said opening to said other end thereof whereby the carton engaging members on said one run of the chain are progressively retracted downwardly through said opening as they are advanced by the chain from said one end of said opening to said other end thereof, means for driving the chain to advance said one run thereof from said one end toward said other end of said opening, and means extending alongside the path of movement of the cartons on said carton support guides for folding certain flaps on the cartons.

14. An apparatus according to claim 13 wherein said carton engaging members are pivotally attached to said chain for swinging movement in a vertical plane relative to the chain, and guide means engages said carton engaging members as they move along said one run of the chain to maintain the carton engaging members generally upright, said guide means terminating at a point spaced from said one end of the opening to allow the carton engaging members to tilt rearwardly with respect to the movement of the chain as they approach said second end of the opening.

15. In a packaging apparatus including means for loading cartons and conveyor means for advancing the cartons, the conveyor means including an endless chain entrained over first and second conveyor sprockets and having carton engaging members at spaced points along the chain, the improvement comprising conveyor drive means including a linear fluid actuator having a reciprocable actuator member movable from a first position to a second position and back, means responsive to movement of said actuator member from said first position to said second position for rotatably driving said first sprocket in one direction to advance the conveyor means and operative when the actuator member is moved from its second position to its first position for interrupting driving of said first sprocket, conveyor stop means including a rotatable member rotatable with one of said sprockets and a stop member engageable with said rotatable member to stop the same in a preselected angular position of the rotatable member, and stop control means responsive to movement of said actuator member from said first position to said second position for operating said stop member to engage the rotatable member and stop the conveyor means.

16. An apparatus according to claim 15 wherein said stop control means comprises a cam member operatively connected to said stop member and extending alongside the path of travel of said actuator member to operate the stop member in accordance with the position of the actuator member.

17. An apparatus according to claim 15 wherein said stop control means comprises an electro-responsive operator for operating the stop member, and switch means operated by said actuator member.

18. An apparatus according to claim 15 wherein said means for rotatably driving said sprocket comprises a drive chain entrained over third and fourth sprockets respectively drivingly connected to said first and second sprockets, and means on said actuator member for advancing said drive chain only in response to movement of said actuator member from said first to said second position.

19. An apparatus for packaging articles in cartons of the type having four interconnected side walls and end closure flaps on at least some of the side walls comprising, an elongated carton guide for guiding erected cartons during movement along a path, conveyor means having spaced carton engaging members for advancing cartons along said carton guide, a magazine for supporting a stack of flattened cartons with the end carton spaced from said carton guide and inclined at an angle to said guide, carton feed means including at least one arm mounted for swinging movement about an axis adjacent the apex of the angle between said carton guide and the end carton in the magazine, first and second vacuum cups on said arm, said first vacuum cup being adjustable along the arm, and means for applying vacuum to said cups including a vacuum line connected to a vacuum supply fitting on said arm adjacent the pivot axis thereof, and first and second means for communicating said vacuum cups with said vacuum supply fittings, said last mentioned means including a flexible tube extending from said vacuum supply fitting to said first cup to enable adjustment of said first cup along the arm.

20. An apparatus according to claim 19 wherein said arm has an opening therein for receiving a slack loop in said tube.

References Cited

UNITED STATES PATENTS

| | | | |
|---|---|---|---|
| 2,900,778 | 8/1959 | Hartbauer | 53—376 |
| 3,264,798 | 8/1966 | Hayes et al. | 53—374 |
| 3,298,287 | 1/1967 | Peterson et al. | 53—374 X |
| 3,299,611 | 1/1967 | Hendrick et al. | 53—186 |

TRAVIS S. McGEHEE, *Primary Examiner.*

R. L. SPRUILL, *Assistant Examiner.*

U.S. Cl. X.R.

53—374; 93—53; 198—135, 170, 173